United States Patent [19]

Rockwell

[11] 4,408,716
[45] Oct. 11, 1983

[54] FLUE GAS HEAT RECOVERY SYSTEM

[76] Inventor: Leon G. Rockwell, 621 N. Lafayette, Dearborn, Mich. 48128

[21] Appl. No.: 353,407

[22] Filed: Mar. 1, 1982

[51] Int. Cl.³ .............................................. F24B 7/00
[52] U.S. Cl. ................................. 237/55; 126/110 E; 126/117; 165/DIG. 2; 237/66
[58] Field of Search .................... 237/55, 66; 126/117, 126/110 E, 110 R, 110 AA; 165/DIG. 2

[56] References Cited

U.S. PATENT DOCUMENTS

| | | | |
|---|---|---|---|
| 2,901,176 | 8/1959 | Hoyt | 237/66 |
| 2,962,218 | 11/1960 | Dibert | 237/55 |
| 3,150,657 | 9/1964 | Shultz | 126/110 E |
| 3,290,864 | 12/1966 | Harker | 237/66 |
| 3,834,355 | 9/1974 | Arant | 237/66 |
| 3,934,798 | 1/1976 | Goldsmith | 165/DIG. 2 |
| 4,044,950 | 8/1977 | Engeling | 237/55 |
| 4,227,647 | 10/1980 | Eriksson | 237/55 |
| 4,241,874 | 12/1980 | Schossow | 237/55 |
| 4,296,883 | 10/1981 | Yanna | 237/66 |
| 4,363,314 | 12/1982 | Albertson | 126/110 E |
| 4,371,111 | 2/1983 | Pernosky | 237/55 |
| 4,379,447 | 4/1983 | Schott | 237/55 |

Primary Examiner—Daniel J. O'Connor
Attorney, Agent, or Firm—Adolph G. Martin

[57] ABSTRACT

A flue gas heat recovery system for use in conjunction with a forced hot air furnace, such system having two conventional heat exchangers, one located in the flue leading from the combustion chamber of the furnace to the chimney, and the other in the cold air chamber of the furnace adjacent the blower fan. Such heat exchangers each have a core connected into a hydraulic circuit which contains an electrically driven circulating pump controlled by a thermal device having a heat actuated switch located in the upper portion of the heat plenum in the furnace.

Such switch is connected into an electric circuit adapted to activate the blower fan and circulating pump simultaneously. The core of the heat exchanger located in the flue of the furnace absorbs a substantial portion of the heat in the exhaust gases which would otherwise be lost to the atmosphere, and utilizes such heat to increase the temperature of the air supplied to the intake of the blower fan in the cold air chamber of the furnace.

1 Claim, 2 Drawing Figures

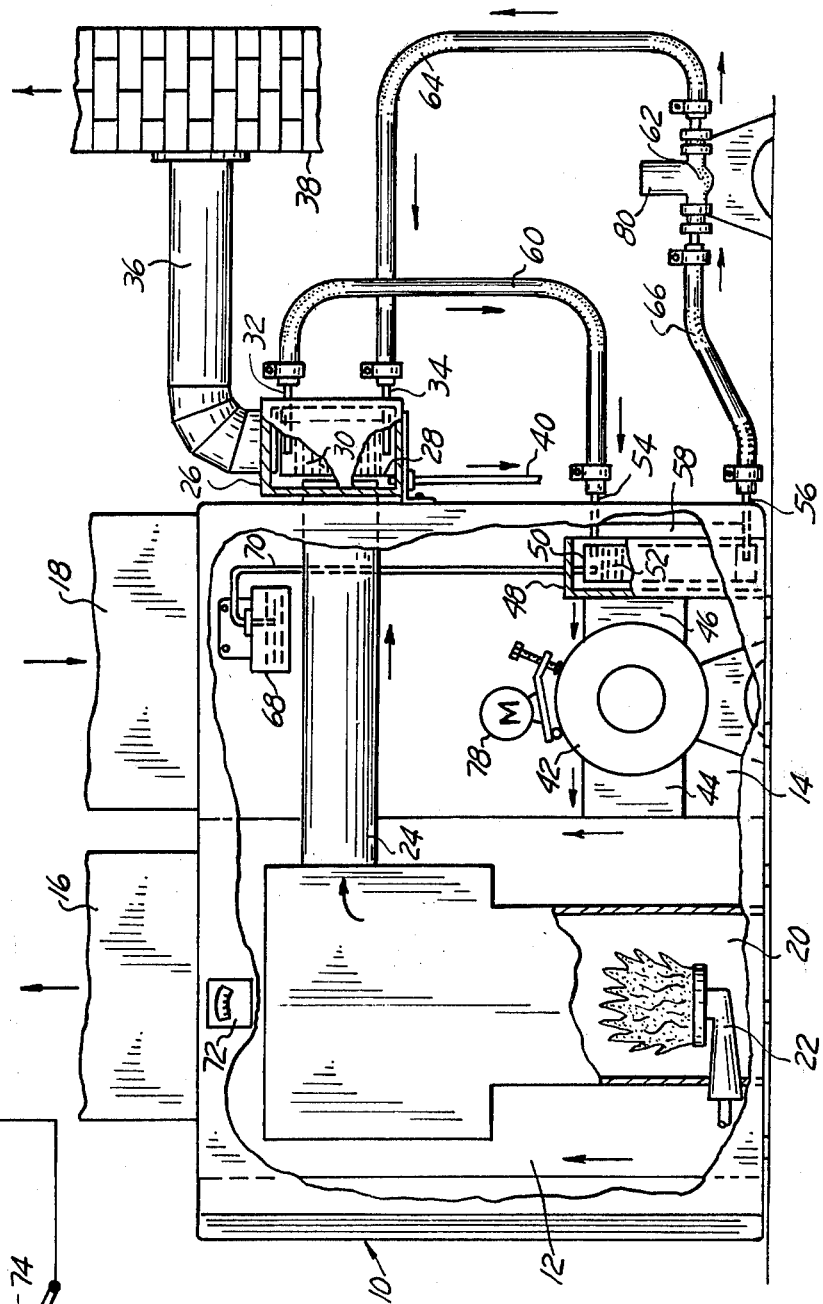
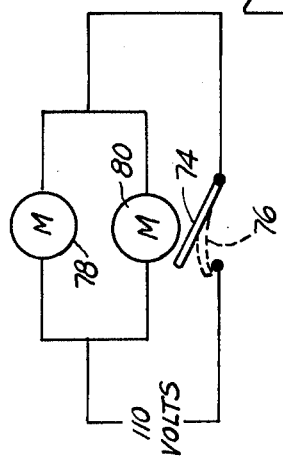

FLUE GAS HEAT RECOVERY SYSTEM

BACKGROUND OF THE INVENTION

This invention relates to space heating equipment generally, but more particularly to a flue gas heat recovery system for use in conjunction with a forced hot air home furnace. Most such furnaces are grossly inefficient, primarily because of heat lost to the atmosphere through the flue. This constitutes a continuous loss of heat, but it occurs at an accelerated rate when the burner is in operation, at which time flue gas temperatures are at a maximum, ranging from 350 to 400 degrees Fahrenheit.

Fully cognizant of this situation, the applicant has developed a heat recovery system which reduces the flue gas discharge temperature to approximately 125 degrees Fahrenheit. As a consequence of this substantial decrease in the discharge temperature, fuel consumption is significantly reduced, and the operating efficiency of the furnace greatly improved. The applicant's heat recovery system thus conserves energy and appreciably reduces home heating costs.

SUMMARY OF THE INVENTION

This invention consists of two heat exchangers 28 and 50, with cores 30 and 52 respectively connected into a hydraulic circuit containing an electrically driven circulating pump 62. One of the heat exchangers 28 is enclosed in a box 26, mountable on an outer panel of a conventional forced hot air furnace 10 and connected to receive the exhaust gases therefrom and absorb a substantial portion of the entrained heat therein before the gases are discharged to the atmosphere.

The other heat exchanger 50 is mountable in the cold air chamber 14 of the furnace 10, and adapted to preheat the air which the blower fan 42 forces into the hot air plenum 12. The electrically driven circulating pump 62 in the hydraulic circuit is connected so as to be actuated simultaneously with the blower fan 42 which is controlled by a thermal device 72 having a heat actuated switch 74 located in the hot air plenum 12 of the furnace 10.

DESCRIPTION OF THE DRAWINGS

FIG. 1 is a fragmentary elevation view, showing the several components of the applicant's system, and their association with the basic units of a typical forced hot air furnace 10.

FIG. 2 is a schematic diagram, showing the circuits for the electric motors 78 and 80 respectively of the blower fan 42 and circulating pump 62.

CONSTRUCTION

For a more detailed description of the invention, reference is made to the drawings in which numeral 10 designates a typical forced hot air furnace having therein a hot air plenum 12 and a cold air chamber 14 communicating respectively with a delivery duct 16 and a return duct 18. A combustion chamber 20 in the hot air plenum 12, contains a burner 22 connected to a flue 24 for discharging exhaust gases.

The flue 24 is connected into a box 26 mounted on the rear panel of the furnace 10. A conventional heat exchanger 28 in the box has a core 30 with hot and cold water connector nipples 32 and 34 respectively. A vent pipe 36, in the upper end of the box 26, communicates with a conventional chimney 38. A tubular conductor 40 is connected into a drain opening in the bottom of the box 26 for removing condensate dripping from the core 30 of the heat exchanger 28.

An electrically driven blower fan 42 in the cold air chamber 14 of the furnace 10, has the discharge side thereof connected to the hot air plenum 12 by a duct 44. The intake side of the blower fan 42 is connected by a duct 46 into a box 48 containing another heat exchanger 50 having a core 52 with hot and cold water connector nipples 54 and 56 respectively. A standard air filter 58 is removably secured over the open side of the box 48.

The hot water connector nipples 32 and 54, of the heat exchangers 28 and 50 respectively, are connected together by a flexible hose 60 or other suitable means. The cold water connector nipples 34 and 56, of the two heat exchangers 28 and 50 respectively, are connected together through an electrically driven circulating pump 62 by two flexible hoses 64 and 66. The closed hydraulic circuit so provided may be charged with water or whatever other fluid is deemed desirable and appropriate.

A reservoir 68, mounted on a wall of the furnace 10, is partially filled with the fluid in the hydraulic circuit, and connected into such circuit by a tubular conductor 70 so as to maintain therein a constant pre-selected pressure. A conventional thermal device 72, mounted on an outer wall of the furnace 10, has a heat actuated switch 74, shown in the schematic electrical diagram comprising FIG. 2 of the drawings, which extends into the hot air plenum 12.

The preceding discussion completes a description of the details relating to the single embodiment of the applicant's invention herein disclosed. However, to facilitate a more thorough understanding of the subject matter herein presented, a discussion of the manner in which the applicant's system operates to fulfill its intended purpose and function is immediately hereinafter set forth.

OPERATION

When the thermostat, not here shown, which controls the furnace 10, actuates the burner 22, the temperature in the hot air plenum 12 increases until the switch 74 of the therman device 72 closes, as shown by the broken lines 76 in FIG. 2 of the drawings. This completes the electrical circuits of the motors 78 and 80 thereby simultaneously activating the blower fan 42 and circulating pump 62 respectively.

The gases produced in the combustion chamber 20, when the burner 22 is in operation, are drawn into the flue 24 which directs them to the box 26 where they pass laterally through the core 30 of the heat exchanger 28, and upward through the vent pipe 36 to the chimney 38 which discharges them to the atmosphere. A substantial portion of the heat in the exhaust gases is extracted as they pass through the core 30, and transferred to the water circulating through the heat exchanger 28.

As the water warms, it rises to the top of the core where it is drawn through the connector nipple 32 into the flexible hose 60 which conducts it to the core 52 of the heat exchanger 50 in the cold air chamber 14 of the furnace 10. Since the blower fan 42 is in operation, it is drawing cold air through the filter 58 and passing it laterally through the core 52 so as to absorb heat from the hot water circulating through the heat exchanger 50.

The air being forced into the hot air plenum 12 by the blower fan 42 is thus preheated, thereby requiring less heat to be produced by the burner 22. As a consequence, fuel consumption is reduced, and a corresponding saving of both energy and heating costs results. The applicant's invention is therefore considered to be especially significant, since fuel conservation is an ever-increasing national concern, and his invention provides a simple and effective heat recovery system which is relatively inexpensive, and may be installed by home owners without any professional assistance.

Based upon the foregoing discussion, the applicant is of the opinion that his invention has fullfilled a long-felt need in the field of flue gas heat recovery systems especially adapted for use in conjunction with forced hot air furnaces, and that he has accordingly made a valuable contribution to the related art. However, while the invention has been described with reference to the details of only a single embodiment, it will be appreciated by those familiar with the related art that the principles involved are susceptible of numerous other practical adaptations.

I therefore claim as new, and desire to secure by Letters Patent:

1. A flue gas heat recovery system for a forced hot air furnace having a combustion chamber, a hot air plenum surrounding the combustion chamber, a flue for conducting gases from the combustion chamber to the atmosphere, a cold air chamber in communication with the hot air plenum, an electrically driven blower fan in the cold air chamber for accelerating the flow of air through the furnace, and a thermal device associated with the hot air plenum controlling the blower fan; such system comprising a first heat exchanger in a heat absorbing relationship with the flue gases, a second heat exchanger in the cold air chamber in a heat transferring relationship with the air passing through the blower fan, a hydraulic circuit connecting the two heat exchangers, an electrically driven pump in the hydraulic circuit adapted to be actuated simultaneously with the blower fan for continuously circulating the fluid in such hydraulic circuit while the blower fan is in operation, a reservoir, a fluid conductor providing communication between the reservoir and such hydraulic circuit for maintaining the pressure therein at a constant preselected level, a box enclosing the first heat exchanger and drain means associated with the box for removing therefrom condensate.

* * * * *